United States Patent
Nicholson

(10) Patent No.: US 7,742,942 B2
(45) Date of Patent: Jun. 22, 2010

(54) SYSTEM AND METHOD FOR DISCOUNTING FUEL

(75) Inventor: G. Randy Nicholson, Abilene, TX (US)

(73) Assignee: Excentus Corporation, Dallas, TX (US)

( * ) Notice: Subject to any disclaimer, the term of this patent is extended or adjusted under 35 U.S.C. 154(b) by 445 days.

(21) Appl. No.: 11/158,674

(22) Filed: Jun. 22, 2005

(65) Prior Publication Data

US 2006/0293947 A1  Dec. 28, 2006

(51) Int. Cl.
G06Q 30/00 (2006.01)
(52) U.S. Cl. .................. 705/14.1; 705/26; 235/275; 235/375; 235/380; 235/381; 235/382; 235/383
(58) Field of Classification Search ........... 705/14.1, 705/26; 235/275, 375, 380, 381, 382, 383
See application file for complete search history.

(56) References Cited

U.S. PATENT DOCUMENTS

| | | | |
|---|---|---|---|
| 3,852,576 A | 12/1974 | Rudd | |
| 4,723,212 A | 2/1988 | Mindrum et al. | |
| 5,299,135 A | 3/1994 | Lieto et al. | |
| 5,466,919 A | 11/1995 | Hovakimian | |
| 5,689,100 A * | 11/1997 | Carrithers et al. | 235/380 |
| 5,700,999 A | 12/1997 | Streicher et al. | |
| 6,032,136 A | 2/2000 | Brake, Jr. et al. | |
| 6,243,688 B1 * | 6/2001 | Kalina | 705/14 |
| 6,292,786 B1 * | 9/2001 | Deaton et al. | 705/14 |
| 6,321,984 B1 * | 11/2001 | McCall et al. | 235/381 |
| 6,332,128 B1 * | 12/2001 | Nicholson | 705/14 |
| 6,741,968 B2 * | 5/2004 | Jacoves et al. | 705/14.23 |
| 6,778,967 B1 | 8/2004 | Nicholson | |
| 6,813,609 B2 * | 11/2004 | Wilson | 705/14 |
| 6,865,547 B1 | 3/2005 | Brake, Jr. et al. | |
| 6,980,960 B2 * | 12/2005 | Hajdukiewicz et al. | 705/14.34 |
| 7,096,190 B2 * | 8/2006 | Postrel | 705/14 |
| 2001/0034651 A1 | 10/2001 | Marks et al. | |
| 2002/0143616 A1 | 10/2002 | Hajdukiewicz et al. | |
| 2006/0086787 A1 * | 4/2006 | Roy et al. | 235/380 |
| 2006/0095328 A1 * | 5/2006 | Ross et al. | 705/14 |

(Continued)

FOREIGN PATENT DOCUMENTS

WO   WO 9118373 A1 *  11/1991

OTHER PUBLICATIONS

Hisey, "Storming the store Card Gates": Jul. 1997.*

(Continued)

*Primary Examiner*—Jean D. Janvier
(74) *Attorney, Agent, or Firm*—Fulbright & Jaworski L.L.P.

(57) ABSTRACT

A system and method of discounting a price-per-unit (PPU) of fuel during a fueling transaction by a customer at a fuel merchant. In one aspect, the invention identifies an issuer of the customer's credit card, associates the issuer with a PPU discount for the fuel, and discounts the posted PPU by an amount equal to the PPU discount associated with the identified credit card issuer. In another aspect, the invention determines that the customer participates in a reward program with a vendor with whom the fuel merchant has a relationship agreement for providing PPU discounts for fuel in exchange for redeemed reward points from the reward program. The customer's reward points are converted to a PPU discount, and the posted PPU of the fuel is discounted accordingly.

16 Claims, 4 Drawing Sheets

U.S. PATENT DOCUMENTS

2006/0271431 A1* 11/2006 Wehr et al. .................... 705/14
2006/0293947 A1   12/2006 Nicholson

OTHER PUBLICATIONS

David Ivanovich, "Exxon-GE MasterCard to Feature Rebates On Gasoline": Houston Chronicle: Sep. 15, 1994.*
U.S. Appl. No. 60/184,185.
U.S. Appl. No. 09/249,842.
U.S. Appl. No. 10/320,724.
Shockey, Don, "Automated Pumps New Krown Jewel," The Sunday Oklahoman, Feb. 26, 1989, 1 page.
Braykovich, Mark, "Want Gas? Biggs Sells That Too," The Cincinnati Enquirer, Oct. 4, 1989, 1 page.
Financial Marketing Consultants, Inc. presentation regarding Krown Systems, 4 pages.
Fuel Incentives External Design Specification, Revision 2, Sep. 22, 1999, Catalina Marketing Corporation, 9 pages.
Grocery Fuel System Installation Manual, Convenient Fuel Group, Version .01, Aug. 1, 1998, 20 pages.
"CFG and Gilbarco," Gilbarco Press Release, Feb. 25, 1999, 2 pages.
"Profit Center 2000 The In-Store marketing program is the competitive advantage," CFG (Convenient Fuel Group), 8 pages.
Convenient Fuels Group System Operation Manual, Version .01, May 10, 1998, 18 pages.
Krone, Donald, et al., "Apparatus for Control and Reporting of Motor Fuel Sales," draft utility patent application, 15 pages.

* cited by examiner

SYSTEM AND METHOD FOR DISCOUNTING FUEL

BACKGROUND OF THE INVENTION

1. Technical Field of the Invention

This invention relates to automated retail systems and methods. More particularly, and not by way of limitation, the invention is directed to a system and method for discounting the price-per-unit (PPU) of fuel at a fuel merchant.

2. Description of Related Art

Vendors of various products often find it desirable to enter into cross-marketing agreements in which the purchase of a product from a first vendor earns a discount coupon for the consumer on a product from a second vendor. As used herein, the term "vendor" refers to the manufacturer of a specific product or the supplier of specific services. The term "merchant" refers to the store where the products are purchased, such as grocery stores, convenience stores, gasoline service stations, unattended fueling stations, and the like.

The issuers of credit and debit cards also have programs to encourage consumers to utilize the issuers' cards when making purchases. Conventionally, these programs have consisted of giveaways of promotional merchandise, low interest rates on unpaid balances and balance transfers from other cards, and cash back at the end of the year (usually 1-2 percent) on purchases made throughout the year. Some manufacturers such as automobile manufacturers have established affinity-type relationships with card issuers to issue credit cards with a manufacturer's logo on the face of the card. Use of such cards results in cash back awards good only on purchases of the associated manufacturers' products. Similarly, some retailers have established affinity-type relationships with card issuers to issue credit cards with a retailer's logo on the face of the card. Use of such cards results in cash back awards good only on purchases within the associated retailer's stores. The manufacturers' programs and the retailers' programs are generally less effective than conventional cash back programs because of the limitations placed on use of the cash back award.

With existing affinity-type relationships, the reward does not occur at the time or point of purchase. Instead, the reward is posted to the customer's credit card account and appears on the customer's monthly account statement. The reward may appear as a monetary credit, or may appear as points, which the customer can redeem when the cumulative total surpasses defined threshold levels. Thus, the reward is not immediate, and the customer must take additional steps to redeem the reward.

A very popular affinity-type reward program provides frequent flyer airline miles as a reward for using a particular credit card. However, there are several problems with this program. For some people, it may take months or even years to reach an award level. Until that time, their accumulated miles are worthless. Other people have trouble redeeming their miles because they fly only at holiday times, and the airlines often have "blackout periods" during the holidays, during which frequent flyer miles are not redeemable.

What is needed in the art is a promotional program for credit cards that overcomes the disadvantages of existing programs while increasing sales of a cross-marketed product such as fuel. The present invention provides such a program.

SUMMARY OF THE INVENTION

In one aspect, the present invention is a computer-implemented method of discounting a price-per-unit (PPU) of fuel at a fuel merchant. The method includes reading a customer's credit or debit card number to begin a fueling transaction at the fuel merchant; identifying an issuer of the card by analyzing the card number; associating the identified issuer of the card with a PPU discount for the fuel; discounting a PPU of the fuel posted on the fuel dispenser by an amount equal to the PPU discount associated with the identified issuer of the credit or debit card; and dispensing fuel to the customer at the discounted PPU. In a further sense, the invention also includes a settlement process in which the value of the discount provided by the fueling merchant is calculated and allocated between the fueling merchant and the issuer of the credit or debit card.

In another aspect, the present invention is a system for discounting a PPU of fuel at a fuel merchant. The system includes an island card reader in a fuel dispenser for reading a customer's credit or debit card number to begin a fueling transaction at the fuel merchant; means for identifying an issuer of the card by analyzing the card number; a relationship database for associating the identified issuer of the credit or debit card with a PPU discount for the fuel; and a dispenser controller for retrieving the PPU discount from the relationship database and discounting a PPU of the fuel posted on the fuel dispenser by an amount equal to the retrieved PPU discount. The system may also include a settlement mechanism that calculates the value of the discount provided by the fueling merchant and allocates the discount between the fueling merchant and the issuer of the credit or debit card.

In yet another aspect, the present invention is a computer-implemented method of discounting a PPU of fuel during a fueling transaction by a customer at a fueling merchant. The method includes reading the customer's credit or debit card number to begin the fueling transaction; identifying the customer by analyzing the card number; and determining that the identified customer participates in a reward program with a vendor with whom the fuel merchant has a relationship agreement for providing PPU discounts for fuel in exchange for redeemed reward points from the vendor's reward program. The method also includes exchanging at least a portion of the customer's reward points for a PPU discount for fuel at a predefined exchange rate associated with the vendor; discounting the PPU of the fuel posted on the fuel dispenser by an amount equal to the PPU discount; and dispensing fuel to the customer at the discounted PPU. In a further sense, the invention also includes a settlement process in which the value of the discount provided by the fueling merchant is calculated and allocated between the fueling merchant and the vendor.

In yet another aspect, the present invention is a computer-implemented method of discounting a PPU of fuel during a fueling transaction by a customer at a fuel merchant. The method includes reading the customer's credit or debit card number to begin the fueling transaction; identifying the customer by analyzing the card number; and determining that the identified customer participates in a reward program with a reward point host with whom the fuel merchant has a relationship agreement for providing PPU discounts for fuel in exchange for redeemed reward points from the reward program. The method also includes retrieving from the reward point host, information regarding the customer's available reward points; converting the customer's available reward points to a PPU discount for fuel; discounting the PPU of the fuel posted on the fuel dispenser by an amount equal to the PPU discount; and dispensing fuel to the customer at the discounted PPU. In a further sense, the invention also includes a settlement process in which the value of the discount provided by the fueling merchant is calculated and allocated between the fueling merchant and the vendor.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
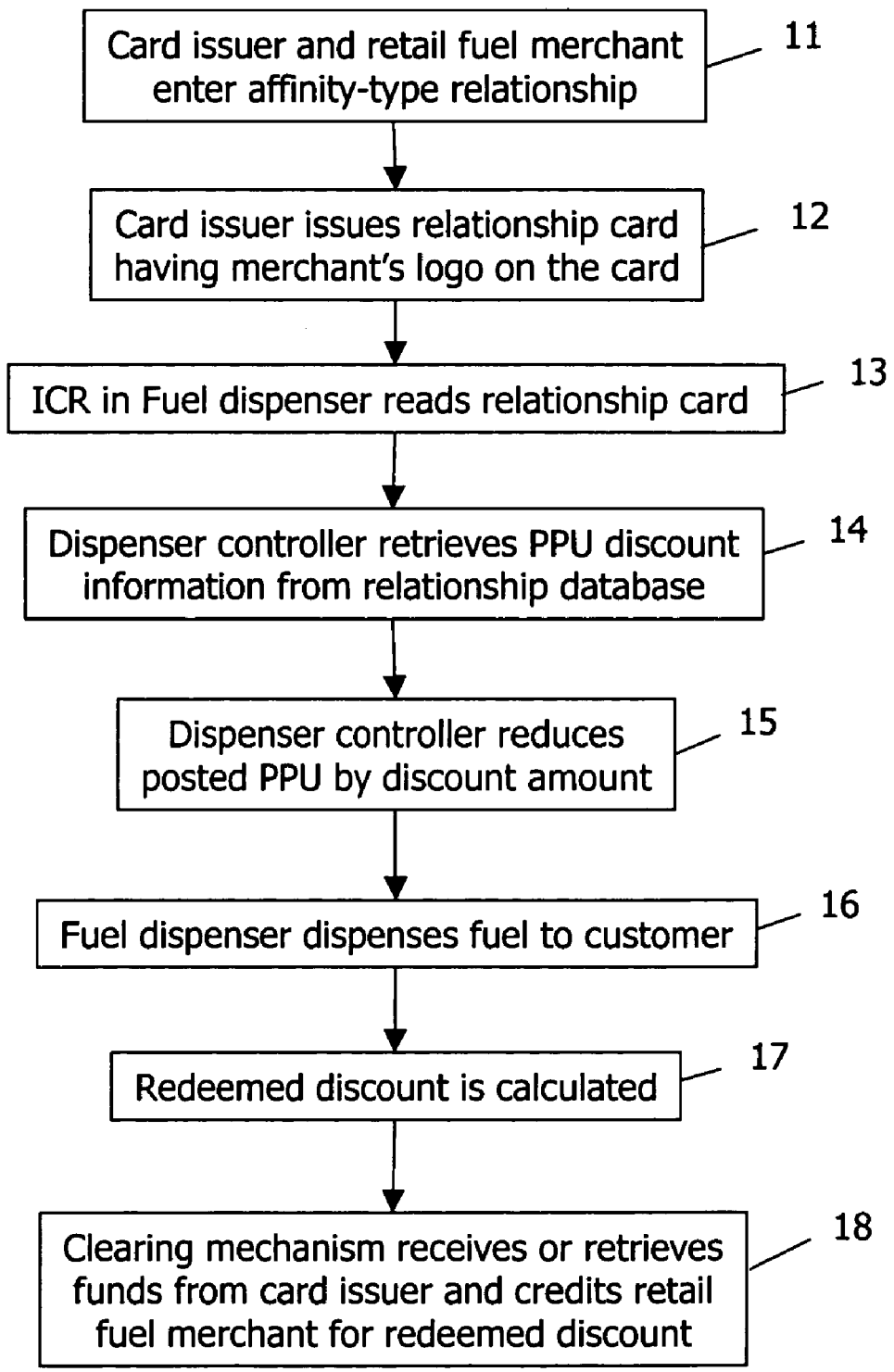
FIG. 1 is a flow chart illustrating the steps of a first embodiment of the method of the present invention.

The present invention is a promotional program for credit, debit, and loyalty cards that overcomes the disadvantages of existing programs while increasing sales of a cross-marketed product such as fuel. In the description herein, financial cards such as credit, debit, and loyalty cards are referred to in the collective as "credit cards".

In one embodiment, the present invention provides a PPU discount for fuel based on the type of credit card or the issuer of the credit card utilized to purchase the fuel. When the card is read at a fuel dispenser or other point-of-sale (POS) terminal at a retail fuel merchant, the Bank Identification Number (BIN) range of the card number may be utilized to identify a specific card issuer such as CitiBank, Wells Fargo, Bank of America, and the like. Other ranges of the card number may be utilized to identify the particular customer and the card brand owner such as Visa, MasterCard, Discover, American Express, and the like. The amount of the PPU discount may be a fixed amount such as ten cents per gallon, or may vary depending on other factors such as the number of times the customer uses the card (or the amount the customer purchases with the card) at the fueling merchant. For example, the first five times the customer uses the card each month at the fueling merchant, the PPU discount is ten cents per gallon. For the sixth through the tenth time the customer uses the card at the fueling merchant in the month, the PPU discount is twenty cents per gallon, and so on. The value of redeemed discounts (i.e., the PPU discount provided to the customer multiplied by the number of gallons purchased) is then allocated between the card issuer, the card brand owner, and the retail fuel merchant in accordance with an agreement between them.

In the preferred embodiment of the present invention, the card issuer enters an agreement with the retail fuel merchant to provide an incentive for customers to use the issuer's card. This may be an affinity-type relationship in which a bank issues the card with an oil company logo on the face of the card. For example, Wells Fargo may issue a relationship card with an Exxon logo on its face. The incentive for customers to use the Wells Fargo relationship card is that they earn an immediate discount on fuel at Exxon stations. A key difference between the inventive affinity-type relationship and existing affinity-type relationships is that the inventive relationship provides an immediate discount at the point of purchase, while existing relationships, as discussed above, provide credits on the customer's credit card statement at a later date, or points that the customer must redeem when an award level is reached.

When the customer uses the relationship card to purchase fuel at the participating retail fueling station, the dispenser immediately lowers the price-per-gallon displayed on the dispenser. The discount may be a fixed amount such as 10 cents per gallon, or may be a percentage discount, which fluctuates with the posted price of the fuel. For example, if the affinity-type agreement between the bank and the retail fuel merchant recites a five percent discount, and the posted street price of the fuel is $2.00 per gallon, the customer sees the price on the dispenser drop by 10 cents per gallon when the dispenser reads the card. If the posted price is $3.00 per gallon, the customer sees the price drop by 15 cents per gallon when the dispenser reads the card. From the customer's perspective, the transaction is complete when the fuel purchase transaction is completed. No future events or actions on the part of the customer are required to utilize an earned reward.

In the preferred embodiment, a dollar amount of the redeemed discount is calculated by multiplying the PPU discount by the number of units of fuel purchased in the transaction. A clearing mechanism tracks the redeemed discounts, receives or retrieves funds from the card issuer, and credits those funds to the retail fueling station. Thus, the retail fueling station always receives the posted street price for the fueling transaction. The card issuer funds the discounts from its credit card transaction fees.

FIG. 1 is a flow chart illustrating the steps of a first embodiment of the method of the present invention. At step 11, a card issuer and a retail fuel merchant enter into an affinity-type relationship, which offers an immediate discount on the PPU of fuel at the merchant's fueling stations if the customer uses the card issuer's relationship card. At step 12, the card issuer issues a relationship credit card with the merchant's logo on the card. Subsequently, a customer uses the relationship card at one of the merchant's fueling station, and at step 13, the Island Card Reader (ICR) in the fuel dispenser reads the magnetic strip on the relationship card. The card information may also be input by other technologies such as a radio frequency identification (RFID) controller with read/write capability, a contactless smart card reader, an audio recognition device, a biometric recognition device, an optical reader, and the like. The BIN range from the card number is utilized to identify the card issuer, and at step 14 the dispenser controller retrieves an associated PPU discount from a relationship database. The retail fuel merchant may have affinity-type relationships with multiple card issuers, and each relationship may specify a different PPU discount level.

At step 15, the dispenser controller reduces the posted PPU of the fuel by the amount of the discount associated with the identified card issuer. At step 16, the fuel is dispensed to the customer at the reduced price. At step 17, the amount of the redeemed discount is calculated by multiplying the PPU discount by the number of units of fuel purchased in the transaction. The redeemed discount may then be stored in a redeemed discount database. At step 18, a clearing mechanism, which interfaces with the redeemed discount database, transfers funds for the amount of the redeemed discount from the card issuer to the retail fuel merchant. Thus, the customer receives an immediate reward, the retail fuel merchant receives the posted street price for the fueling transaction, and the card issuer funds the discount from its credit card transaction fees.

Figure 2:
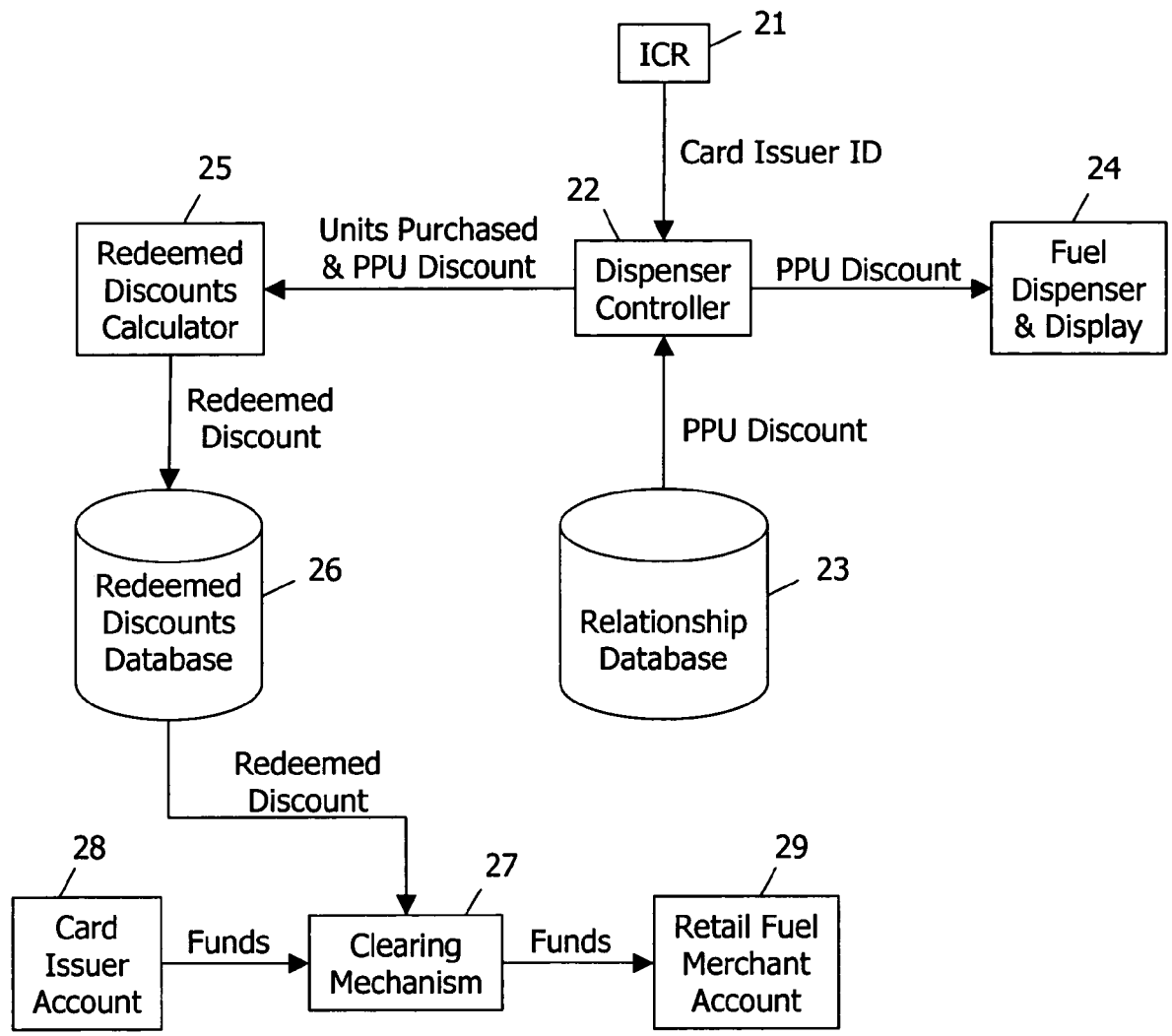
FIG. 2 is a simplified block diagram of a first embodiment of the system of the present invention.

FIG. 2 is a simplified block diagram of a first embodiment of the system of the present invention. When a customer uses a relationship card to purchase fuel at one of the merchant's fueling stations, the Island Card Reader (ICR) 21 in the fuel dispenser (or other input device) reads the relationship card. The BIN range is utilized to identify the card issuer, and a card issuer ID is passed to a dispenser controller 22. Alternatively, the ICR may send the card number to the dispenser controller, and the controller may determine the identification of the card issuer. The dispenser controller uses the card issuer ID to access a relationship database 23 and retrieve an associated PPU discount. The controller then reduces the posted street price on the dispenser display 24 by the amount of the associated PPU discount, and causes the fuel dispenser to dispense the fuel at a discounted price.

When the customer indicates the transaction is complete (for example by replacing the fuel nozzle in its holder), the dispenser controller 22 sends the number of units of fuel purchased and the PPU discount to a redeemed discounts calculator 25. The calculator may be incorporated into the dispenser controller, or may be implemented separately. The calculator preferably calculates the amount of the redeemed discount by multiplying the PPU discount by the number of units of fuel purchased in the transaction. The redeemed discount may then be stored in a redeemed discount database 26 where it is associated with the card issuer and the retail fuel merchant. A clearing mechanism 27 interfaces with the redeemed discount database, and retrieves the redeemed discount and the associated IDs of the card issuer and the retail fuel merchant. The clearing mechanism transfers funds for the amount of the redeemed discount from the card issuer's account 28 to the retail fuel merchant's account 29.

Figure 3:
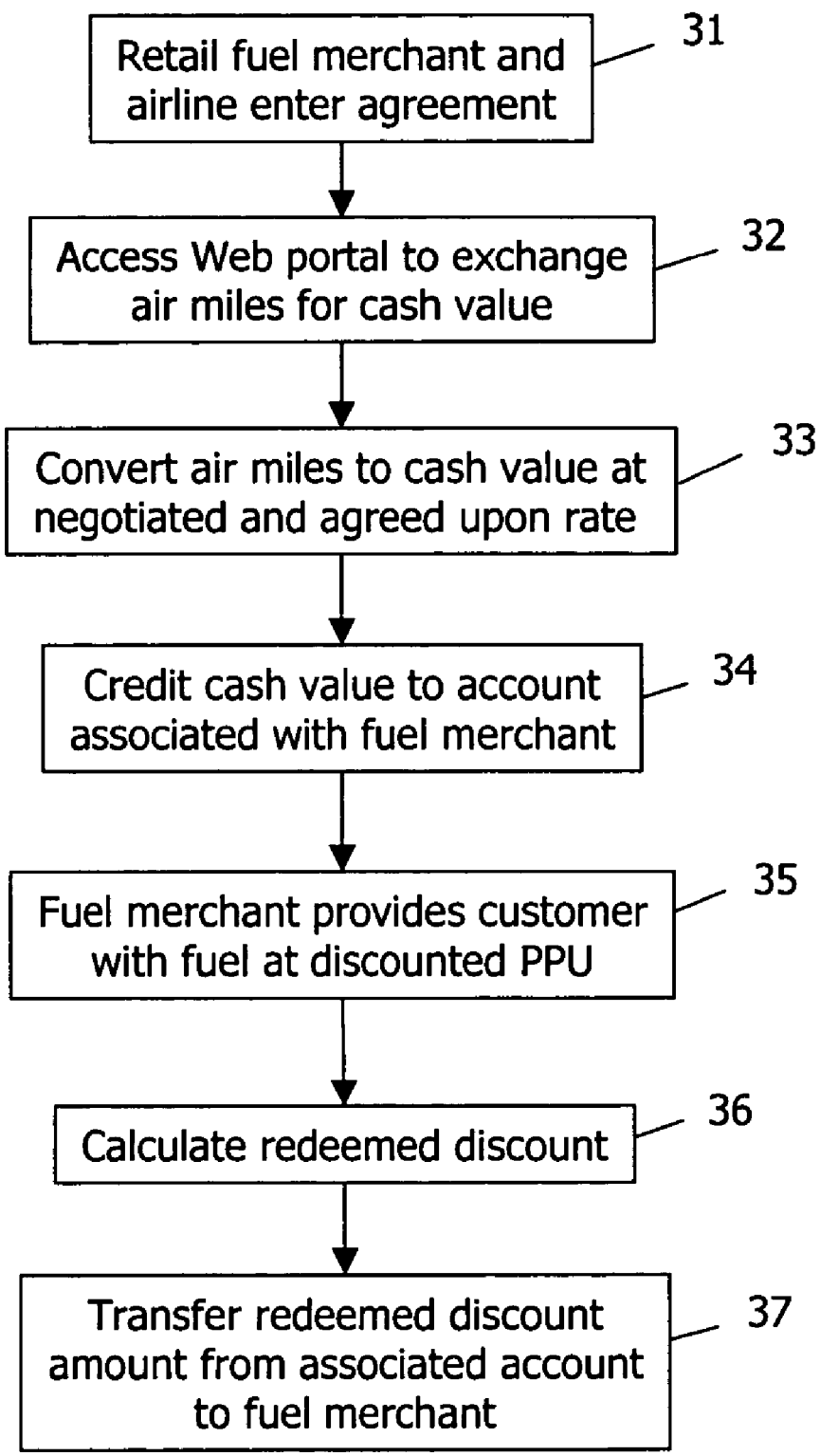
FIG. 3 is a flow chart illustrating the steps of a second embodiment of the method of the present invention.

FIG. 3 is a flow chart illustrating the steps of a second embodiment of the method of the present invention. In this embodiment, an agreement between a retail fuel merchant and a card issuer and/or third party vendor enables customers to use their accumulated reward points or frequent flyer miles as a tender type at a fueling station. Reward points or miles are exchanged for a PPU discount on fuel at a defined exchange rate. In the example illustrated in FIG. 3, a retail fuel merchant and an airline enter an agreement at step 31. The airline has a frequent flyer program that awards air miles to customers who fly on the airline or make other purchases using an affinity-type relationship credit card. At step 32, a Web portal is accessed in order to exchange air miles in the customer's frequent flyer account for a cash value. At step 33, in a so-called "batch transfer" mode of operation, air miles from the customer's frequent flyer account are converted to a promotional cash value at a negotiated and agreed upon exchange rate. At step 34, the promotional cash value is then credited to an account associated with the retail fuel merchant. At step 35, the merchant provides a negotiated and agreed upon PPU discount to the customer in a fueling transaction. At step 36, the amount of the redeemed discount is then calculated by multiplying the PPU discount by the number of units of fuel purchased in the transaction. At step 37, the amount of the redeemed discount is transferred to the retail fuel merchant from the associated account, and the amount of the redeemed discount and the number of miles redeemed is reported to the airline.

Thus, the invention enables a customer to trade in air miles in exchange for a PPU discount, such as a cents-off-per-gallon discount, on fuel at the retail fuel merchant's fueling stations. The retail fuel merchant makes up for most or all of the discount by drawing from the associated account. The airline benefits because more of their customers are motivated to use their affinity-type credit cards to generate air miles because they know they can exchange the air miles for fuel discounts. The airline also benefits because their customers are motivated to use their air miles for fuel discounts rather than free airline travel, thus increasing the number of seats available to sell to paying passengers.

Figure 4:
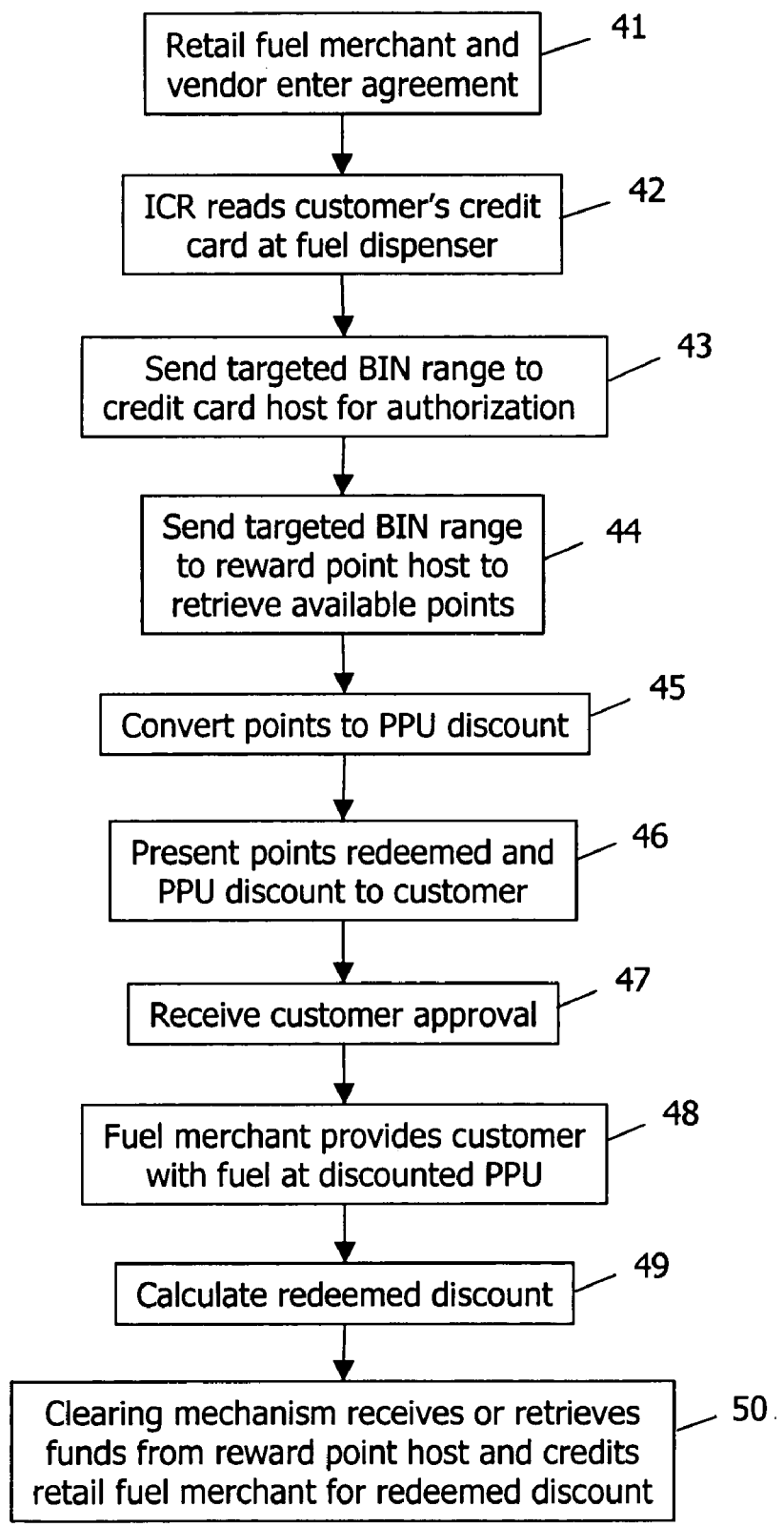
FIG. 4 is a flow chart illustrating the steps of a third embodiment of the method of the present invention.

FIG. 4 is a flow chart illustrating the steps of a third embodiment of the method of the present invention. In this embodiment, reward points are again exchanged for a PPU discount on fuel, but the customer is given real-time access to his reward point totals. At step 41, the retail fuel merchant and a vendor having a reward or loyalty point program enter an agreement, which allows reward points to be redeemed for PPU discounts on fuel. A customer participating in the program then initiates a fuel purchase at one of the retail fuel merchant's fueling stations. At step 42, the ICR in the dispenser reads the customer's credit card. At step 43, a targeted BIN range is sent to the credit card host for authorization processing as known in the art. At step 44, a targeted BIN range identifying the customer is sent to a reward points host to retrieve information regarding the number of reward points in the customer's account available for exchange. At step 45, the available points are converted to a PPU discount amount based on a negotiated exchange rate.

At step 46, the number of points to be redeemed and the resulting PPU discount are presented to the customer for approval. If the customer has a large number of points in his account, several levels of redemption/PPU discounts may be presented, and the customer may select which level he desires to apply to this fueling transaction. At step 47, the customer's approval is received, and at step 48, the retail fuel merchant provides the customer with fuel at a price discounted by the amount of the approved PPU discount. When the fueling transaction is complete, the redeemed discount is calculated at step 49. At step 50, a clearing mechanism transfers funds for the amount of the redeemed discount from the reward point host to the retail fuel merchant.

Thus, the invention enables a customer to exchange reward or loyalty points for a PPU discount, such as a cents-off-per-gallon discount, on fuel at the retail fuel merchant's fueling stations. The retail fuel merchant receives the posted street price for the fueling transaction because the reward point host pays the discount. The reward point host benefits because customers are motivated to increase their reward point totals by shopping at the reward point host or purchasing the reward point host's products.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A computer-implemented method of discounting a price-per-unit (PPU) of fuel at a fuel merchant and increasing customer use of third-party financial cards issued by a plurality of third-party issuers, wherein the third-party financial cards are selected from a group consisting of credit cards and debit cards, said method comprising:

storing in a database, a PPU discount associated with one of third-party issuers, wherein the PPU discount is defined in affinity-type agreements between a fuel merchant and third-party issuers;

reading a customer's financial card number to begin a fueling transaction at the fuel merchant, wherein said financial card is available for use by said customer at a plurality of non-affiliated merchant locations;

identifying the third-party issuer of the financial card by analyzing the financial card number, each issuer having a PPU discount individually associated therewith;

associating the identified third-party issuer of the financial card with the stored PPU discount for the fuel;

discounting a PPU of the fuel posted on the fuel dispenser by an amount equal to the PPU discount associated with the identified issuer of the financial card;

dispensing a number of units of fuel to the customer at the discounted PPU;

calculating a redeemed discount by multiplying the dispensed number of units of fuel by the PPU discount associated with the identified third-party issuer of the financial card; and allocating the redeemed discount between the third-party issuer of the financial card and the fuel merchant wherein said reading, identifying, associating and calculating are performed by a computing device.

2. The method of claim 1, wherein the step of identifying the third-party issuer of the financial card includes analyzing a Bank Identification Number (BIN) range within the financial card number.

3. The method of claim 1, further comprising storing in the relationship database, identities of a plurality of financial card issuers, wherein each given financial card issuer is associated with a PPU discount negotiated by the given financial card issuer and the fuel merchant.

4. The method of claim 1, wherein the PPU discount associated with the identified third-party issuer of the financial card is a fixed discount value that does not vary with the posted PPU of the fuel.

5. The method of claim 1, wherein the PPU discount associated with the identified third-party issuer of the financial card is a percentage of the posted PPU of the fuel, and the method further comprises, prior to the discounting step, the step of calculating a current PPU discount based on the PPU of the fuel posted on the fuel dispenser and the percentage discount.

6. The method of claim 1, further comprising the steps of:
providing the redeemed discount to a clearing mechanism; and
wherein the step of allocating the redeemed discount between the third-party issuer of the financial card and the fuel merchant includes reimbursing the fueling merchant for the redeemed discount by the identified issuer of the financial card.

7. The method of claim 6, wherein the step of providing the redeemed discount to a clearing mechanism includes the steps of:
storing the redeemed discount in a redeemed discounts database; and
interfacing the clearing mechanism with the redeemed discounts database.

8. The method of claim 6, further comprising transferring funds by the clearing mechanism from an account associated with the third-party financial card issuer to an account associated with the fuel merchant, wherein the transferred funds are equal to the redeemed discount.

9. A system for discounting a price-per-unit (PPU) of fuel at a fuel merchant and increasing customer use of a third-party financial card issued by a third-party issuer, wherein the third-party financial card is selected from a group consisting of different issuers of credit cards, said system comprising:
an input device in a fuel dispenser for reading a customer's financial card number to begin a fueling transaction at the fuel merchant, said financial card being usable by said customer at any of a number of non-affiliated vendor locations;
means for identifying the third-party issuer of the financial card by analyzing the financial card number;
a relationship database for associating the identified issuer of the financial card with a stored PPU discount for the fuel, said PPU discount individualized to said issuer, wherein the stored PPU discount is defined in an affinity-type agreement between the fuel merchant and the third-party issuer;
a dispenser controller for retrieving the PPU discount from the relationship database, discounting a PPU of the fuel posted on the fuel dispenser by an amount equal to the retrieved PPU discount, and dispensing fuel to the customer at the discounted PPU;
means for calculating a redeemed discount by multiplying the dispensed number of units of fuel by the PPU discount associated with the identified issuer of the financial card; and
means for allocating the redeemed discount between the third-party issuer of the financial card and the fuel merchant.

10. The system of claim 9, wherein the input device is selected from a group consisting of a magnetic card reader, a smart card reader, a radio frequency identification device (RFID) controller, an audio recognition device, a biometric recognition device, and an optical reader.

11. The system of claim 9, wherein the relationship database stores identities of a plurality of financial card issuers, wherein each given financial card issuer is associated with a PPU discount negotiated by the given financial card issuer and the fuel merchant.

12. The system of claim 9, further comprising:
means for providing the redeemed discount to a clearing mechanism; and
wherein the means for allocating the redeemed discount between the third-party issuer of the financial card and the fuel merchant includes means for reimbursing the fueling merchant for the redeemed discount by the identified issuer of the financial card.

13. The system of claim 12, wherein the means for providing the redeemed discount to a clearing mechanism includes:
a redeemed discounts database; and
an interface adapted to provide the clearing mechanism with access to the redeemed discounts database.

14. The system of claim 12, wherein the clearing mechanism includes means for transferring funds from an account associated with the third-party financial card issuer to an account associated with the fuel merchant, wherein the transferred funds are equal to the redeemed discount.

15. The system of claim 9, wherein the PPU discount associated with the identified third-party issuer of the financial card is a fixed discount value that does not vary with the posted PPU of the fuel.

16. The system of claim 9, wherein the PPU discount associated with the identified third-party issuer of the financial card is a percentage of the posted PPU of the fuel, and the system further comprises means for calculating a current PPU discount based on the PPU of the fuel posted on the fuel dispenser and the percentage discount.

* * * * *